United States Patent
Anthony et al.

(10) Patent No.: US 6,405,818 B1
(45) Date of Patent: Jun. 18, 2002

(54) HYBRID ELECTRIC VEHICLE WITH LIMITED OPERATION STRATEGY

(75) Inventors: Joseph William Anthony, Ann Arbor; Ming Lang Kuang, Canton, both of MI (US)

(73) Assignee: Ford Global technologies, Inc., Dearborn, MI (US)

( * ) Notice: Subject to any disclaimer, the term of this patent is extended or adjusted under 35 U.S.C. 154(b) by 0 days.

(21) Appl. No.: 09/546,831

(22) Filed: Apr. 11, 2000

(51) Int. Cl.[7] .................................................. B60K 1/00
(52) U.S. Cl. ..................... 180/65.8; 180/65.2; 180/65.4
(58) Field of Search ............................... 180/65.1, 65.2, 180/65.3, 65.4, 65.8; 318/151, 153; 701/99, 101

(56) References Cited

U.S. PATENT DOCUMENTS

| | | | |
|---|---|---|---|
| 5,433,282 A | | 7/1995 | Moroto et al. |
| 5,697,466 A | * | 12/1997 | Moroto et al. ............. 180/65.2 |
| 5,791,427 A | | 8/1998 | Yamaguchi |
| 5,823,281 A | | 10/1998 | Yamaguchi et al. |
| 6,003,626 A | * | 12/1999 | Ibaraki et al. ............. 180/65.2 |
| 6,098,735 A | * | 8/2000 | Sadarangani et al. ...... 180/65.2 |
| 6,209,672 B1 | * | 4/2001 | Severinsky ................ 180/65.2 |

\* cited by examiner

*Primary Examiner*—J. J. Swann
*Assistant Examiner*—Christopher Bottorff
(74) *Attorney, Agent, or Firm*—Ford Global Tech. Inc.

(57) ABSTRACT

A hybrid electric vehicle 10 having a propulsion system 12 which includes an internal combustion engine 14, a generator/motor 16 and an electric motor or a "traction inverter module" 18 which cooperatively provide power to the drive train 28 of vehicle 10. Vehicle 10 includes a controller 44 which is effective to detect whether any faults are present within any of the torque providing subsystems (e.g., in engine 14, generator/motor 16 and/or motor 18), and if one or more faults is. present, to provide a limited operation strategy which allows the vehicle to be driveable by use of the remaining operational subsystem(s).

12 Claims, 2 Drawing Sheets

HYBRID ELECTRIC VEHICLE WITH LIMITED OPERATION STRATEGY

FIELD OF THE INVENTION

This invention relates to a hybrid electric vehicle and more particularly, to a hybrid electric vehicle having a limited operation strategy which provides a driver or user with limited operation of the vehicle in the presence of faults within any of the power train subsystems.

BACKGROUND OF THE INVENTION

Hybrid electric vehicles ("HEV") utilize both an internal combustion engine and one or more electric motors to generate power and torque. One type of hybrid electric vehicle, commonly referred to as a "parallel" or "power split" type hybrid electric vehicle, includes three power train subsystems which cooperatively provide the torque necessary to power the vehicle. Particularly, a "power split" type hybrid electric vehicle includes an engine subsystem (e.g., an internal combustion engine and controller), a generator subsystem (e.g., a motor/generator and controller), and a motor subsystem or an "electric drive subsystem" (e.g., an electric motor and controller).

In this type of HEV power train configuration, there are two "power sources" that are connected to the drive line: 1) a combination of engine and generator subsystems which are interconnected by use of a planetary gear set, and 2) the motor subsystem. In the first power source, the engine connects to the carrier of the planetary gear set, the generator connects to the sun gear of the planetary gear set, and the ring gear of the planetary gear set outputs power from the engine and/or from the generator to the drive line. By controlling the generator appropriately, the planetary gear set serves as a power split device that splits the engine output to the generator and to the drive line as desired, and as a continuous variable transmission ("CVT") between the engine and the ring gear which is connected to the drive line. The second power source, (e.g., electric motor) drives the ring gear and provides propulsion to the vehicle independently from the first power source. In this manner, the two power sources can provide propulsion to the vehicle simultaneously and independently.

This hybrid configuration provides improved fuel economy, and reduced emissions since the internal combustion engine can be operated at its most efficient/preferred operating points by use of the previously described "CVT" function. Additionally, this configuration can achieve better driveability, and may extend vehicle performance relative to a comparative conventional vehicle. In order to achieve the goal, appropriate coordination and control between subsystems in the HEV are essential. This goal is achieved by use of a central vehicle system controller ("VSC") and a hierarchical control architecture.

Hybrid electric vehicles typically use a VSC to interpret driver inputs (e.g., gear selection, accelerator position and braking effort), to coordinate each of the vehicle subsystems, and to determine the vehicle system operation state. The VSC generates commands to appropriate subsystems based on driver inputs and control strategies, and sends the generated commands to the respective subsystems effective to cause the subsystems to take appropriate actions to meet the driver's demands.

While the foregoing control strategy is effective to efficiently operate the vehicle under normal operating conditions, it suffers from some drawbacks. Particularly, if a fault occurs in any one or more of the vehicle's power train subsystems, the vehicle may no longer be driveable, thereby leaving a driver or operator stranded.

There is therefore a need for a hybrid electric vehicle which includes a limited operation strategy which allows the vehicle to continue to function and drive in the presence of a fault in one or more of the power train subsystems.

SUMMARY OF THE INVENTION

It is a first object of the invention to provide a hybrid electric vehicle which overcomes at least some of the previously delineated drawbacks of prior hybrid electric vehicles.

It is a second object of the invention to provide a hybrid electric vehicle which includes a limited operating strategy which allows the vehicle to be driven when a fault occurs in one or more of the vehicle's power train subsystems.

It is a third object of the invention to provide a hybrid electric vehicle having a power split configuration and allowing certain portions of the power train to operate when other portions are inoperable.

It is a fourth object of the invention to provide a limited operation strategy for fault management which controls and coordinates the functioning power train subsystems in the hybrid electric vehicle when one or more of the power train subsystems is in a fault condition, thereby providing the driver with "limp home operation" if possible.

According to a first aspect of the present invention, a hybrid electric vehicle is provided. The hybrid electric vehicle includes a drive train; an engine subsystem which is operatively coupled to the drive train and which selectively provides torque to the drive train; a generator subsystem which is operatively coupled to the drive train and which selectively provides torque to the drive train; an electric motor subsystem which is operatively coupled to the drive train and which selectively provides torque to the drive train; and a controller which is communicatively coupled to the engine subsystem, to the generator subsystem, and to the electric motor subsystem. The controller is effective to detect whether a fault exists in any of the subsystems, and upon the detection, to allow the hybrid electric vehicle to operate by use of less than all of the subsystems.

Further objects, features, and advantages of the invention will become apparent from the following detailed description of the preferred embodiment of the invention and by reference to the following drawings.

DETAILED DESCRIPTION OF THE PREFERRED EMBODIMENT OF THE INVENTION

Figure 1:
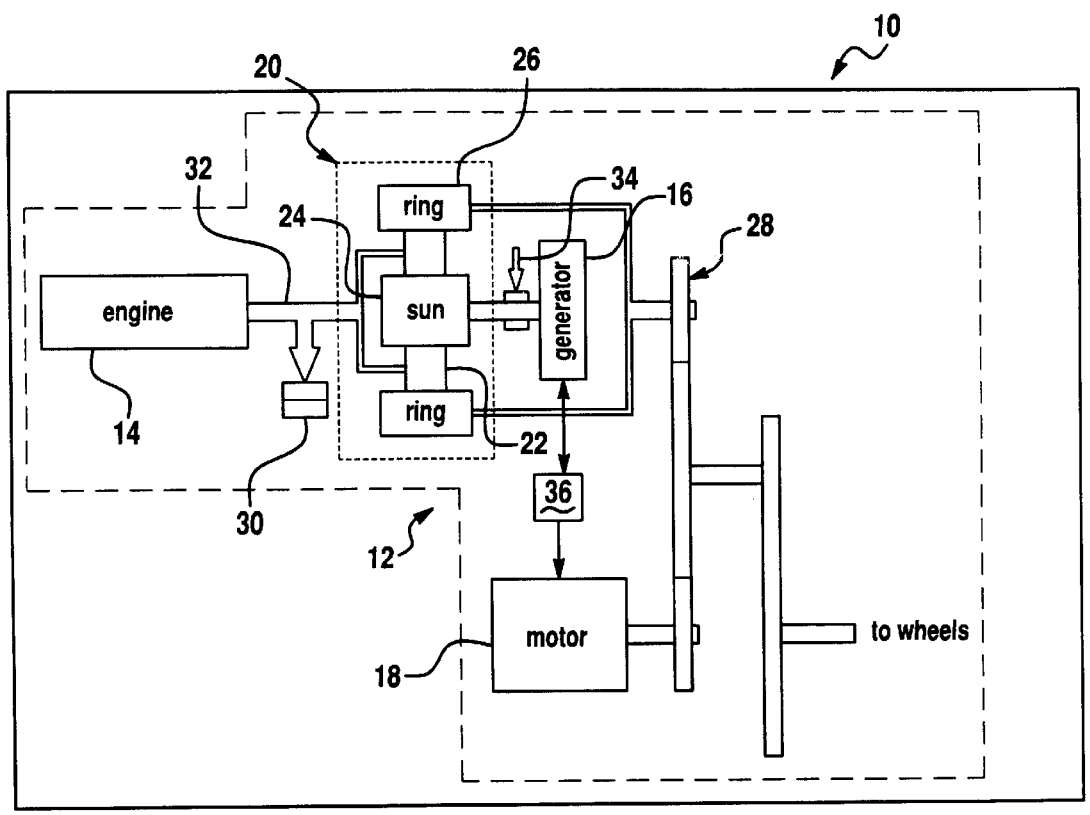
FIG. 1 is a block diagram of a hybrid electric vehicle which includes a limited operation strategy and which is made in accordance with the teachings of a preferred embodiment of the present invention.

Referring now to FIG. 1, there is shown an automotive hybrid electric vehicle 10 having a powertrain, propulsion or drive system 12 which is made in accordance with the teachings of the preferred embodiment of the present invention. As should be appreciated to those of ordinary skill in the art, propulsion system 12 is a parallel or "power split" type propulsion system, and includes an internal combustion engine 14, an electric generator/motor 16, and a motor subsystem 18.

The engine 14 and generator 16 are interconnected by use of a conventional planetary gear set 20, including a carrier 22, a sun gear 24 and a ring gear 26, which is operatively coupled to drive line 28. System 12 further includes a conventional one-way clutch 30 which is operatively coupled to the output shaft 32 of engine 14, and a brake or clutch assembly 34 which is operatively coupled to generator 16. A conventional electrical energy storage device 36 (e.g., a battery or other electrical energy storage device) is operatively coupled to generator 16 and motor 18. Battery 36 receives and provides power from/to generator 16 and provides power to/from motor 18.

In the preferred embodiment of the invention, the engine 14 is a conventional internal combustion engine, and is physically and operatively coupled to the carrier 22 of the planetary gear set 20. Generator 16 is a conventional motor/generator and is physically and operatively coupled to the sun gear 24 of the planetary gear set 20. Planetary gear set 20 allows engine 14 and generator 16 to cooperate as a "single power source" which provides a single power or torque output from the ring gear 26 of the planetary gear set 20 to the drive line 28. It should be appreciated that planetary gear set 20 further serves as a power split device that splits the output from engine 14 to the generator 16 and to the drive line 28, and as a continuous variable transmission ("CVT") between the engine 14 and the ring gear 26, which is operatively coupled to and drives the wheels of vehicle 10.

The electric motor 18 is a conventional electric motor which acts as a "second power source" that provides torque and power to the vehicle drive line 28 independently from the first power source (i.e., engine 14 and generator 16). In this manner, the two power sources (i.e., the internal combustion engine and generator and the electric motor) cooperatively deliver torque and power to the vehicle 10 simultaneously and independently.

Figure 2:
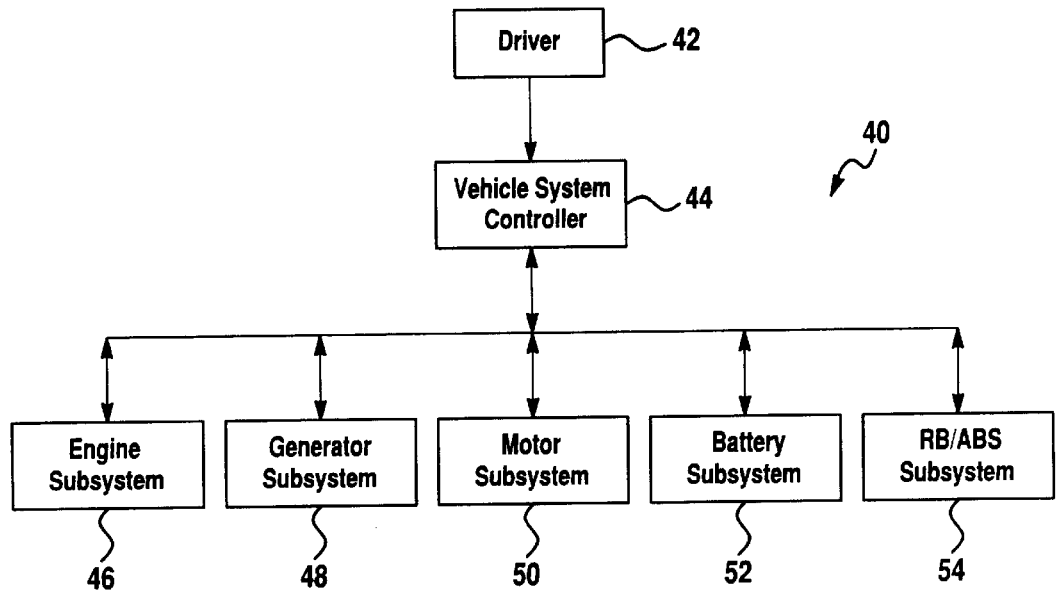
FIG. 2 is a block diagram illustrating the control system architecture utilized within the hybrid electric vehicle shown in FIG. 1.

Referring now to FIG. 2, there is illustrated the hierarchical control system 40 which is employed within vehicle 10. In the preferred embodiment of the invention, a central control system or vehicle system controller ("VSC") 44 is electrically and communicatively coupled to conventional user or driver operated controls or components 42 and to one or more conventional vehicle operating condition sensors (not shown). Controller 44 receives signals and/or commands generated by driver inputs and vehicle operating condition sensors (e.g., gear selection, accelerator position, and braking effort), and processes and utilizes the received signals to determine the amount of torque which is to be provided to the vehicle's drive train 28 and to generate commands to the appropriate subsystems or controllers 46–54 to selectively provide the desired torque to the drive train 28. Controller 44 further monitors each of the subsystems 46–54 to determine and/or detect the existence of a fault condition in any of the subsystems.

In the preferred embodiment, each subsystem 46–54 includes one or more microprocessors or controllers as well as other chips and integrated circuits which cooperatively control the operation of propulsion system 12. In the preferred embodiment, controller 46 comprises a conventional engine controller, controller 48 comprises a conventional generator controller, controller 50 comprises a conventional motor controller, controller 52 comprises a conventional battery controller, and controller 54 comprises a conventional regenerative and anti-lock braking controller. Controllers 44–54 may each comprise a separate controller or may be embodied within a single controller, chip, microprocessor or device. Controller 44 is effective to determine the total amount of torque which is to be provided or delivered to drive train 28 and to partition or divide the total amount of torque between the various subsystems.

In the control system architecture 40, the VSC 44 is typically the "superior" controller, with subsystems 46–54 acting as "subordinate" controllers. Exceptions exist to allow one or more of subsystems 46–54 to override a command from "VSC" 44 with a "peer" subsystem command (e.g., a command from another of subsystems 46–54) under certain predetermined conditions. For example and without limitation, if a commanded regenerative braking torque exceeds the tire/road friction torque that the road surface can sustain, the RB/ABS subsystem 54 will take an appropriate action to assure vehicle stability, and will inform the VSC 44 and motor subsystems 50 of the action(s) undertaken. The motor subsystem 50 will override the VSC commanded regenerative braking torque with the torque command from the RB/ABS subsystem 54. In such instances, each subsystem 46–54 communicates with the VSC 44 to inform the VSC 44 of the actual action undertaken which deviates from the VSC commanded action. Each subsystem 46–54 further communicates a signal to VSC 44 when one or more faults are detected in the respective subsystem 46–54, thereby notifying controller 44 that a fault condition is present.

In operation, when one or more faults occur in any of the power train subsystems, the vehicle 10 and/or VSC 44 enters into "limited operation strategy" ("LOS") mode. In the preferred embodiment of the invention, the fault conditions that make vehicle 10 and/or VSC 44 operate under LOS mode are as follows: (i) engine subsystem 46 shuts down or becomes inoperable; (ii) generator subsystem 48 shuts down or becomes inoperable; (iii) engine subsystem 46 and generator subsystem 48 shut down or become inoperable; and (iv) motor subsystem 50 shuts down or becomes inoperable.

Figure 3:
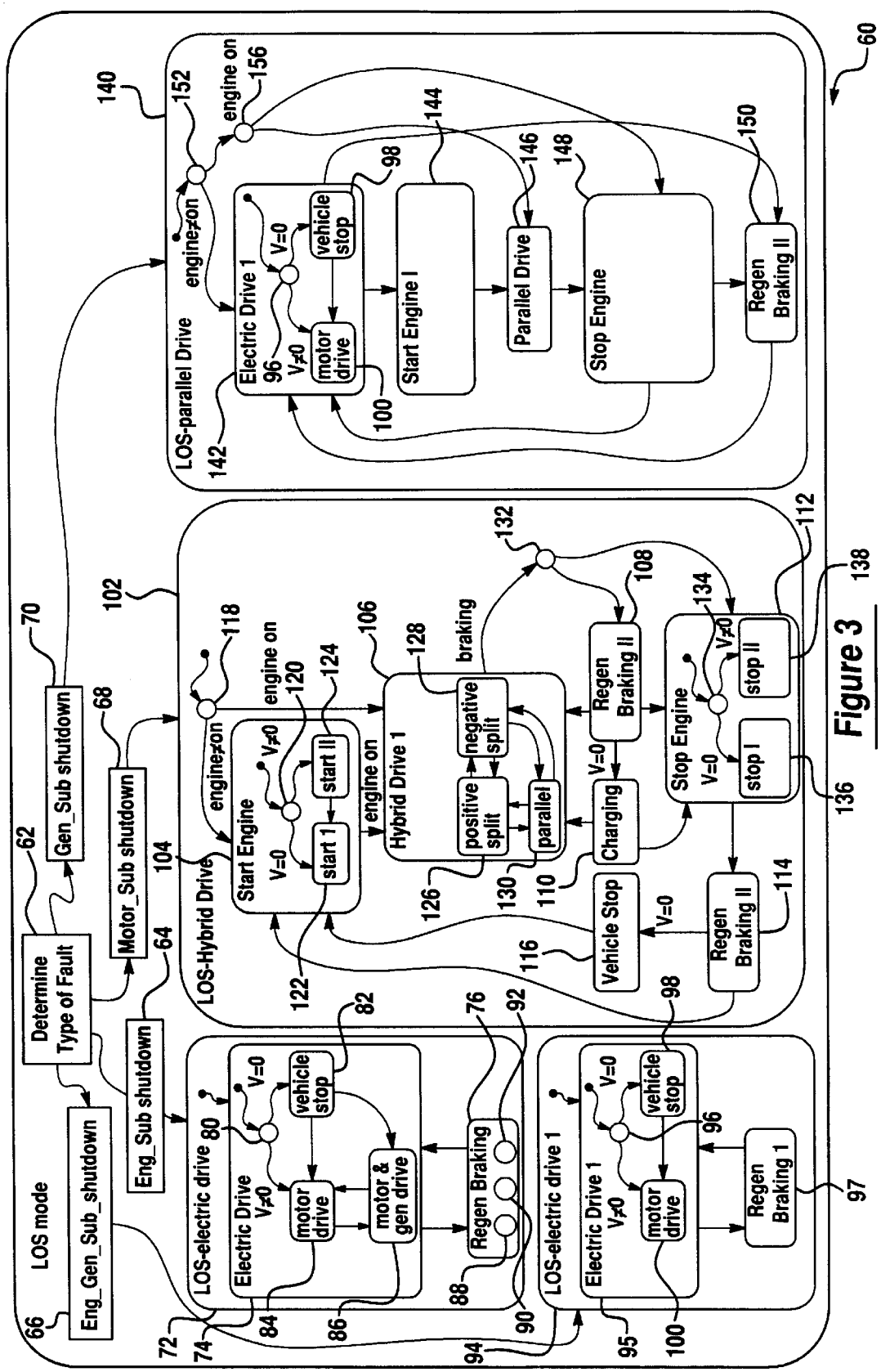
FIG. 3 is a block diagram illustrating one non-limiting embodiment of the limited operation strategy performed by the hybrid electric vehicle shown in FIG. 1.

When any one of the conditions above is true, the VSC 44 will control the power train subsystems 46–54 using the LOS strategy. One non-limiting embodiment of the LOS strategy 60 is illustrated in FIG. 3 in a state or flow diagram format.

As illustrated in functional block or step 62, controller 44 first determines the nature or type of fault which has occurred (e.g., which one or more subsystems has "reported" or communicated fault information to controller 44). Based upon the nature of the fault which has occurred, controller 44 selects the operational mode or state 72, 94, 102 or 140 in which it will operate. When an engine subsystem fault or shut down is detected, as illustrated in block 64, controller 44 enters "LOS-electric drive mode", which is illustrated by block 72.

LOS-electric drive mode includes two "sub-states" or "sub-modes", and more particularly, includes an Electric Drive mode 74 and a Regenerative Braking mode 76. In LOS-electric drive mode 72, controller 44 disables the faulty engine subsystem 46 and causes the vehicle 10 to be propelled solely by the motor subsystem 50 (e.g., motor 18) and the Generator subsystem 48 (e.g., generator 16).

When controller 44 enters LOS-electric drive mode 72, it proceeds to functional block or step 80, where it determines whether the vehicle speed is zero. If the vehicle speed is zero, controller 44 enters the "Vehicle Stop "sub-sub-state" or mode 82, otherwise controller 44 enters the Motor Drive "sub-sub-state" or mode 84. When controller 44 is in state 82 and receives a torque command (e.g., from driver controls 42), controller 44 compares the demanded torque to a predetermined calibrateable value "$T_{gen\_assistist}$". If the demanded torque is greater than zero and less than $T_{gen\_assistist}$, controller 44 enters state 84, in which only the Motor subsystem 50 or motor 18 is used to propel or drive vehicle 10.

If the demanded torque exceeds $T_{gen\_assist}$, controller 44 enters "motor and generator drive sub-sub-state" 86, in which both the Motor subsystem 50 (e.g., motor 18) and the Generator subsystem 48 (e.g., generator 16) are used to propel or drive vehicle 10. Controller 44 continuously monitors the demanded torque while vehicle 10 is in Electric Drive Sub-state 74. Whenever the demanded torque falls between zero and $T_{gen\_assistist}$, controller 44 enters state 84 and propels the vehicle 10 using motor 18; whenever the demanded torque exceeds $T_{gen\_assistist}$, controller 44 enters state 86 and propels the vehicle 10 using generator 16 and motor 18; and whenever the demanded torque equals or is less than zero, controller 44 enters state 82 and does not deliver any torque to the drive line 28 (e.g., controller 44 shuts off generator 16 and motor 18).

If the driver demands braking at any time while controller 44 is in Electric Drive mode 74, controller 44 enters the Regenerative Braking mode 76. In the preferred embodiment of the invention, Regenerative Braking mode 76 includes three braking "sub-sub-states" or modes: high speed braking 88, normal braking 90, and engine braking 92. Upon entry into the Regenerative Braking sub-state, controller 44 determines whether the vehicle is running at a speed greater than a predetermined value "$V_{max\_gen}$" and whether battery 36 can accept charge. If the vehicle speed exceeds "$V_{max\_gen}$", controller 44 enters high speed braking mode 88. In high speed braking mode 88, the controller 44 causes generator 16 to be operated as a generator, thereby producing a reaction torque within generator 16 which assists in slowing the vehicle 10 and prevents generator "over speed". If the vehicle speed in less than $V_{max\_gen}$, and the battery 36 can accept charge, controller 44 enters the normal braking mode 90 in which the Motor subsystem 50 provides the braking torque to meet the driver's demands (also in which the ABS subsystem 54 provides additional braking torque if necessary). If the battery 36 cannot accept any more charge, controller 44 enters into engine brake mode 92 in which the generator 16 is operated as a motor (rotating in the same direction as the engine) to force the engine 14 to rotate to achieve engine braking.

Whenever a significant fault is present in both the engine subsystem 46 and the generator subsystem 48 (e.g., a fault which prevents engine 14 and generator 16 from functioning properly), as illustrated in block 66, controller enters "LOS-electric drive I" mode, which is illustrated by block 94. In LOS-electric drive mode I, controller 44 disables the faulty subsystems 46 and 48 and propels vehicle 10 solely by use of the Motor subsystem 50 (i.e., motor 18). The control/operation of the Motor subsystem is substantially similar to that described in LOS-electric drive mode 74 excluding the generator-assist function or mode 86. Particularly, LOS-electric drive I mode 94 includes an Electric Drive I mode 95 and a Regenerative Braking I mode 97.

When controller 44 enters LOS-electric drive I mode 94, it proceeds to functional block or step 96, where it determines whether the vehicle speed "V" is zero. If the vehicle speed is zero, controller 44 enters the "Vehicle Stop "sub-sub-state" 98, which is substantially identical to state 82, otherwise controller 44 enters the "Motor Drive "sub-sub-state" 100, which is substantially similar to state 84. Controller 44 continuously monitors the demanded torque while vehicle 10 is in states 98–100. Whenever the demanded torque exceeds zero, controller 44 enters state 100 and propels the vehicle 10 using motor 18; and whenever the demanded torque equals or is less than zero, controller 44 enters state 98 and does not deliver any torque to the drive line 28 (e.g., controller 44 shuts off motor 18).

If the drive demands braking at any time while controller 44 is in Electric Drive I mode 95, controller 44 enters the Regenerative Braking I mode 97. In 5 Regenerative Braking I mode 97, when the driver demands braking, only the Motor subsystem 50 provides regenerative braking torque since the generator 16 is not operational. Additionally, the ABS subsystem 54 will provide additional braking torque if necessary to meet 10 the driver's demands.

Whenever a significant fault is present in the Motor subsystem 50 (e.g., a fault which prevents motor 18 from functioning properly), as illustrated in block 68, controller 44 enters "LOS-hybrid drive" mode, which is illustrated by block 102. In LOS-hybrid drive mode 102, controller 44 disables the faulty motor subsystem 50 (e.g., motor 18) and propels vehicle 10 by use of the engine subsystem 46 (e.g., engine 14) and the generator subsystem 48 (e.g, generator 16). LOS-hybrid drive mode 102 includes seven sub-states: Start Engine mode 104, Hybrid Drive I mode 106, Braking & Charging mode 108, Charging mode 110, Stop Engine mode 112, Regenerative Braking II mode 114, and Vehicle Stop mode 116.

When controller 44 enters LOS-hybrid drive mode 102, it first determines whether the engine 14 is "on" or "running", as illustrated by functional block or step 118. If the engine 14 is not "on", controller 44 proceeds to Start Engine mode 104. In functional block or step 120, controller 44 determines whether the vehicle 10 is in motion. If the vehicle 10 is not in motion, controller 44 enters Start I mode 122, in which the generator 16 provides the necessary positive torque to start the engine 14. Otherwise, controller 44 proceeds to Start II mode 124, in which controller 44 commands the generator 16 to provide negative torque, thereby "pulling up" or increasing the engine speed to its minimum "start speed" (i.e., the speed at which the engine 14 will start) by use of the vehicle's kinematics energy, since the vehicle is in motion. If the engine speed cannot be increased to its minimum "start speed" by use of the generator's negative torque, controller 44 proceeds to Start I mode 122 when the generator speed reaches the zero. In Start I mode 122, generator 16 provides the positive torque required to start engine 14.

Once the engine 14 has been "started", controller 44 proceeds to Hybrid Drive I mode 106. Depending on the driver's demands and the desired energy management strategy, controller 44 selectively alternates between three sub-states: positive split mode 126, negative split mode 128, and parallel mode 130. While in positive split mode 126, the engine output power is split to propel the vehicle 10 and to drive the generator, thereby charging battery 36. When the speed of the engine 14 is required to be controlled or reduced, controller 44 enters negative split mode 128, in which the generator 16 is operated as a motor rotating opposite to direction of the engine 14 rotation, thereby regulating the engine speed. When the battery cannot accept any more charge, controller 44 enters parallel mode 130, in which the generator brake is activated (e.g., the sun gear locked), and the engine output power propels the vehicle 10.

When driver demands braking, controller 44 exits Hybrid Drive I mode 106 and enters either Braking & Charging sub-state 108 or Stop Engine sub-state 112. Particularly, in functional block or step 132, controller 44 determines whether battery 36 can accept any more charge. If battery charging is permitted (e.g., if battery 36 can accept charge), the vehicle 10 enters Braking & Charging sub-state 108, in which engine 14 and generator 16 are controlled such that the engine 14 will not be stalled and the vehicle 10 is decelerated by use of ABS subsystem 54 (if necessary) to meet the driver's demand. While in sub-state 108, if controller 44 determines that charging is no longer permitted, controller 44 proceeds to Stop Engine mode 112. If the driver demanded braking is terminated and/or if the vehicle 10 is being accelerated, controller 44 returns to Hybrid Drive I mode 106. If the vehicle speed reaches zero in Braking and Charging mode 108, controller 44 proceeds to Charging mode 110, in which the vehicle 10 is at rest (e.g., gear selection is in the "Park" or "Neutral" position or the brake pedal is depressed) and engine 14 operates to charge battery 36. Once the vehicle 10 begins moving, controller 44 moves from Charging sub-state 110 to Hybrid Drive I mode 106. If while in mode 110, battery charging is no longer permitted, controller 44 enters Stop Engine sub-state or mode 112.

If controller 44 determines that charging is not permitted in step 132, the controller 44 enters the Stop Engine sub-state 112 where the engine is shut down. Particularly, in step 134 of sub-state 112, controller 44 determines if the vehicle speed is zero, and if so, controller 44 immediately shuts off engine 14, as illustrated by Stop I mode 136. Otherwise, controller 44 enters Stop II mode 138, in which generator 16 is utilized to "slow" the speed of engine 14 to a predetermined value, before "shutting off" engine 14.

Once the engine 14 is "shut off", controller 44 enters Regenerative Braking II sub-state 114, in which the generator 16 is controlled to provide engine braking and to prevent generator over speed. When the vehicle is stopped, controller 44 proceeds to Vehicle Stop sub-state 116, in which the vehicle is at rest. When acceleration is demanded in either Regenerative Braking II mode 114 or in Vehicle Stop mode 116, controller 44 proceeds to Start Engine sub-state 104, in which controller 44 starts engine 14.

When a significant fault is detected in the generator subsystem 48 (e.g., a fault which prevents generator 16 from functioning properly), as illustrated in block 70, controller 44 enters "LOS-parallel drive" mode, which is illustrated by block 140. In LOS-parallel drive mode 140, controller 44 disables the faulty generator subsystem 48 and the vehicle 10 is propelled by the engine subsystem 46 (e.g., engine 14) and the Motor subsystem 50 (e.g., motor 18). LOS-parallel drive mode 140 includes five sub-states: Electric Drive I mode 142, Start Engine II mode 144, Parallel Drive mode 146, Stop Engine II mode 148, and Regenerative Braking I mode 150.

Upon entry into the LOS-parallel drive mode 140, controller 44 determines whether the engine 14 is "on" or "running", as illustrated by functional block or step 152. If the engine 14 is not running, controller 44 enters Electric Drive I sub-state 142, which is substantially identical to Electric Drive I sub-state 95 (e.g., the Motor subsystem 50 provides propulsion to the vehicle if required). While in Electric Drive sub-state 142, if the driver demands vehicle braking, controller 44 proceeds to Regenerative Braking I sub-state 150. Also, if the vehicle speed exceeds than a predetermined threshold value "$V_{min}$" (equivalent to minimum engine RPM to start), controller enters Start Engine II sub-state 144, in which the generator brake 34 is activated and the engine 14 is cranked to start.

Once the engine 14 is started, controller 44 enters Parallel Drive sub-state 146, in which the engine subsystem 46 (e.g., engine 14) provides propulsion to the vehicle and drives the motor 18 to charge the battery 36 if required. While in Parallel Drive mode 146, if the vehicle speed becomes less than $V_{min}$, controller 44 enters Stop Engine II sub-state 148, in which the engine 14 is shutdown.

After the engine stops, the controller 44 enters either Regenerative Braking I sub-state 150 or Electric Drive I sub-state 142 depending on driver's demand. Particularly, if the driver demands vehicle braking, controller 44 enters Regenerative Braking I sub-state 150, and if the driver demands vehicle acceleration, controller 44 proceeds to Electric Drive sub-state 142. In Regenerative Braking I sub-state 150, only the Motor sub-system 50 provides electrical braking based on the driver's braking demand.

If engine 14 is "on" or "running" upon entry of the LOS-parallel drive mode 140, controller 44 proceeds to functional block or step 156, in which it determines whether the generator brake 34 is engaged. If the generator brake 34 is engaged, controller 44 directly enters Parallel Drive sub-state 146 directly. If the engine 14 is "on" and the generator brake 34 is not engaged, controller 44 enters the Stop Engine II sub-state 148 and proceeds to shut down the engine 14.

It should be appreciated that the foregoing Limited Operation Strategy 60 allows vehicle 10 to be driveable even in the presence of one or more faults or "shutdowns" in the propulsion subsystems 46, 48 and 50 (e.g., engine 14, generator 16 and motor 18). Additionally, the Limited Operation Strategy 60 utilizes the remaining subsystems in a cooperative manner to maximize their efficiency, and to best compensate for the faulty non-operational subsystem.

It is understood that the invention is not limited by the exact construction or method illustrated and described above, but that various changes and/or modifications may be made without departing from the spirit and/or the scope of the inventions.

What is claimed is:

1. A method for limited operation of a hybrid electric vehicle of the type having an engine, a generator and a motor which are cooperatively coupled to and selectively provide torque to a drive line, said method comprising the steps of:

providing a controller which is effective to monitor said engine, said generator and said motor, and to selectively and controllably operate said vehicle by use of said engine, said generator and said motor;

determining whether a fault exists within said engine; and causing said controller to operate in an LOS-electric drive mode if a fault exists within said engine, said controller being effective, while in said LOS-electric drive mode, to selectively operate said vehicle by use of only said motor and said generator.

2. The method of claim 1 further comprising the steps of:

determining an amount of torque which is desired to be provided to said drive line;

causing said controller to compare sa id amount of torque to a threshold value when said controller is operating in said LOS-electric drive mode; and causing said controller to selectively operate said vehicle by use of only said motor if said amount of torque is less than said threshold value.

3. A method of claim 2 further comprising the steps of:

determining whether a fault exists within said generator; and causing said controller to operate in an LOS-parallel drive mode if a fault exists within said generator, said controller being effective, while in said LOS-parallel drive mode, to selectively operate said vehicle by use of only said motor and said engine.

4. A method of claim 3 further comprising the steps of:

determining whether a fault exists within said generator; and causing said controller to operate in an LOS-electric drive 1 mode if a fault exists within said engine and said generator, said controller being effective, while in said LOS-electric drive 1 mode, to selectively operate said vehicle by use of only said motor.

5. A method of claim 4 further comprising the step of:

causing said controller to operate in an LOS-electric drive 1 mode if a fault exists within said engine and said generator, said controller being effective, while in said LOS-electric drive 1 mode, to selectively operate said vehicle by use of only said motor.

6. A method of claim 5 further comprising the steps of:

determining whether a fault exists within said motor; and causing said controller to operate in an LOS-hybrid drive mode if a fault exists within said motor, said controller being effective, while in said LOS-hybrid drive mode, to selectively operate said vehicle by use of only said generator and said engine.

7. A method for operating the powertrain of a hybrid electric vehicle in the presence of a faulty subsystem, said hybrid electric vehicle being of the type having an engine subsystem, a generator subsystem, and a motor subsystem which selectively and cooperatively provide torque to said powertrain, said method comprising the steps of:

selectively monitoring said engine subsystem, said generator subsystem, and said motor subsystem;

determining which of said engine subsystem, said generator subsystem and said motor subsystem are properly operational and which of said subsystems are faulty;

disabling any one of said subsystems which are faulty; and operating said vehicle by use of only those two of said subsystems which are properly operational.

8. The method of claim 7 further comprising the step of:

operating said vehicle in a first mode if only in said engine subsystem is faulty, said first mode being effective to cause said vehicle to use only said generator subsystem and said motor subsystem to provide torque to said powertrain.

9. The method of claim 8 further comprising the step of:

operating said vehicle in a second mode if only said motor subsystem is faulty, said second mode being effective to cause said vehicle to use only said generator subsystem and said engine subsystem to provide torque to said powertrain.

10. The method of claim 9 further comprising the step of:

operating said vehicle in a third mode if only said generator subsystem is faulty, said third mode being effective to cause said vehicle to use only said motor subsystem and said engine subsystem to provide torque to said powertrain.

11. The method of claim 8 wherein said engine subsystem, said generator subsystem and said motor subsystem are cooperatively arranged in a power-split type configuration.

12. The method of claim 11 wherein said engine subsystem, said generator subsystem and said motor subsystem are interconnected by use of a planetary gear set.

* * * * *